United States Patent
Tinnakornsrisuphap et al.

(10) Patent No.: US 8,825,051 B2
(45) Date of Patent: Sep. 2, 2014

(54) IDLE HANDOFF TO HYBRID FEMTO CELL BASED ON SYSTEM SELECTION DATABASE

(75) Inventors: Peerapol Tinnakornsrisuphap, San Diego, CA (US); Young C. Yoon, San Diego, CA (US); Ravindra M. Patwardhan, San Diego, CA (US); Srinivasan Balasubramanian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 580 days.

(21) Appl. No.: 12/769,496

(22) Filed: Apr. 28, 2010

(65) Prior Publication Data
US 2010/0279689 A1 Nov. 4, 2010

Related U.S. Application Data

(60) Provisional application No. 61/174,834, filed on May 1, 2009.

(51) Int. Cl.
| | | |
|---|---|---|
| H04W 36/00 | (2009.01) | |
| H04W 36/14 | (2009.01) | |
| H04W 84/04 | (2009.01) | |
| H04W 4/00 | (2009.01) | |
| H04W 48/18 | (2009.01) | |
| H04W 36/06 | (2009.01) | |
| H04W 88/10 | (2009.01) | |

(52) U.S. Cl.
CPC ............. *H04W 36/14* (2013.01); *H04W 48/18* (2013.01); *H04W 36/06* (2013.01); *H04W 88/10* (2013.01); *H04W 36/0077* (2013.01); *H04W 84/045* (2013.01)
USPC ........ 455/436; 455/435.2; 455/444; 455/434; 370/331; 370/338

(58) Field of Classification Search
CPC .......... H04W 84/045; H04W 36/0077; H04W 48/18; H04W 60/00; H04W 8/18; H04W 92/02; H04W 48/02; H04W 4/22; H04W 36/0083; H04W 36/0088; H04W 36/08; H04W 48/08; H04W 36/0005; H04W 36/0094; H04W 17/0077
USPC ............................................... 455/435.2, 436
See application file for complete search history.

(56) References Cited

U.S. PATENT DOCUMENTS

| 7,916,715 B2 | 3/2011 | Rezaiifar et al. |
| 2005/0130662 A1* | 6/2005 | Murai ........................... 455/444 |

(Continued)

FOREIGN PATENT DOCUMENTS

| JP | 2000125333 A | 4/2000 |
| JP | 2010512055 A | 4/2010 |

(Continued)

OTHER PUBLICATIONS

Humblet P et al: "System design of CDMA2000 femtocells" IEEE Communications Magazine, IEEE Service Center, Piscataway, US LNKDDOI: 10.1109/MC0M.2009.5277461, vol. 47, No. 9, Sep. 1, 2009, pp. 92-100, XP011283370 ISSN: 0163-6804 p. 97,98 Preferred User Zone List, Dual Mode Mobile issues.

(Continued)

*Primary Examiner* — Timothy Pham

(57) ABSTRACT

Devices and methods are provided for facilitating handing over to a hybrid femto access point that implements multiple radio access technologies (RATs), including a first RAT and a second RAT. In one embodiment, the method involves detecting a pilot from the hybrid femto access point, wherein the pilot is associated with the first RAT. The method involves registering with the hybrid femto access point on a first channel associated with the first RAT based upon the detected pilot. A system selection database is analyzed to identify a second channel associated with the second RAT, and a selection to handover to the identified second channel is effectuated.

45 Claims, 12 Drawing Sheets

(56) References Cited

U.S. PATENT DOCUMENTS

| | | | |
|---|---|---|---|
| 2006/0286983 A1* | 12/2006 | Otsuka et al. | 455/444 |
| 2007/0202875 A1* | 8/2007 | Dorsey et al. | 455/434 |
| 2009/0052395 A1* | 2/2009 | Bao et al. | 370/331 |
| 2009/0111468 A1* | 4/2009 | Burgess et al. | 455/436 |
| 2009/0131050 A1* | 5/2009 | Osborn | 455/435.1 |
| 2009/0181676 A1* | 7/2009 | Lee et al. | 455/436 |
| 2009/0207805 A1* | 8/2009 | Zou | 370/331 |
| 2010/0054219 A1* | 3/2010 | Humblet et al. | 370/338 |
| 2010/0128608 A1* | 5/2010 | Zou et al. | 370/237 |
| 2010/0151858 A1* | 6/2010 | Brisebois et al. | 455/434 |
| 2010/0278141 A1* | 11/2010 | Choi-Grogan et al. | 370/331 |

FOREIGN PATENT DOCUMENTS

| | | |
|---|---|---|
| KR | 20050085781 A | 8/2005 |
| WO | WO2009026036 | 2/2009 |

OTHER PUBLICATIONS

International Search Report and Written Opinion—PCT/US2010/033322, International Search Authority—European Patent Office—Oct. 4, 2010.

Recommended System Selection Requirements for 1X and 1xEVDO—Capable Terminals CDMA Development Group Mar. 15, 2007, XP002599308 Retrieved from the Internet: URL:http://wiki.cdg.org/w/images/6/6e/143v1.1 .doc [retrieved on Sep. 2, 2010]. pp. 1-11 paragraphs 5-5.3 (59 pages).

Tiedemann E.G.: "Femtocell Activities in 3GPP2 TSG-C" 3GPP2 Mar. 31, 2009, (17 pages) XP002599307 Retrieved from the Internet: URL:ftp://ftp.3gpp2.org/TSGX/Working/2009/2009-03-New%20Orleans/All%20TSG%20Femto%20Discussion/ XS1 - 20090331 -004_TSG-C_Femto%20Overview-090330.ppt [retrieved on Sep. 2, 2010].

C_Femto%20Overview-090330.ppt [retreived on Sep. 2, 2010].

Taiwan Search Report—TW099113977—TIPO—Apr. 1, 2013.

* cited by examiner

IDLE HANDOFF TO HYBRID FEMTO CELL BASED ON SYSTEM SELECTION DATABASE

CLAIM OF PRIORITY UNDER 35 U.S.C. §119

The present application for patent claims priority to Provisional Application No. 61/174,834 entitled "IDLE HANDOFF TO FEMTO CELL OF HIGH RATE PACKET DATA (HRPD) ACCESS TERMINAL BASED ON PREFERRED ROAMING LIST," filed May 1, 2009, and is assigned to the assignee hereof, and is hereby expressly incorporated in its entirety by reference herein.

BACKGROUND

1. Field

The present application relates generally to wireless communications, and more specifically to methods and systems for handing over to a femto access point.

2. Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include Code Division Multiple Access (CDMA) systems, Time Division Multiple Access (TDMA) systems, Frequency Division Multiple Access (FDMA) systems, 3rd Generation Partnership Project (3GPP) Long Term Evolution (LTE) systems, and Orthogonal Frequency Division Multiple Access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

A MIMO system supports time division duplex (TDD) and frequency division duplex (FDD) systems. In a TDD system, the forward and reverse link transmissions are on the same frequency region so that the reciprocity principle allows the estimation of the forward link channel from the reverse link channel. This enables the access point to extract transmit beamforming gain on the forward link when multiple antennas are available at the access point.

In addition, a new class of small base stations has emerged, which may be installed in a user's home and provide indoor wireless coverage to mobile units using existing broadband Internet connections. Such a base station is generally known as a femto access point, but may also be referred to as Home Node B (HNB) unit, Home evolved Node B unit (HeNB), femto cell, femto Base Station (fBS), base station, or base station transceiver system. Typically, the femto access point is coupled to the Internet and the mobile operator's network via a Digital Subscriber Line (DSL), cable internet access, T1/T3, or the like, and offers typical base station functionality, such as Base Transceiver Station (BTS) technology, radio network controller, and gateway support node services. This allows an Access Terminal (AT), also referred to as a cellular/mobile device or handset, or User Equipment (UE), to communicate with the femto access point and utilize the wireless service.

With the deployment of a multitude of radio access technologies (RATs) and support for these technologies in mobile multimode devices, there is a growing need to facilitate handover to femto access points that implement a multiple types of RATs. In a heterogeneous wireless access environment that includes, for example, a femto access point that implements multiple RATs, it would be desirable to facilitate hand-in to the femto access point without adding a beacon signal for each implemented RAT, which would otherwise have the undesired effect of increasing interference levels.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with methods for handing over to a femto access point that implements multiple radio access technologies (RATs), including, for example, a first RAT and a second RAT. A femto access point that supports two or more RATs may be referred to as a hybrid femto access point. The method may involve detecting a pilot from a hybrid femto access point, the pilot being associated with the first RAT. The method may involve registering with the hybrid femto access point on a first channel associated with the first RAT based upon the detected pilot. The method may involve analyzing a system selection database to identify a second channel associated with the second RAT of the hybrid femto access point. The method may involve selecting to handover to the identified second channel.

In one embodiment, the first RAT may comprise 1x and the second RAT may comprise High Rate Packet Data (HRPD), also known as 1xEV-DO. The step of analyzing the system selection database may comprise analyzing Preferred Roaming List (PRL) records, also referred to as System Selection Preferred Roaming (SSPR) lists. For example, at least one of the PRL records may comprise a dedicated System Identifier (SID) for the hybrid femto access point. In the alternative, or in addition, at least one of the PRL records may comprise an assigned Network Identifier (NID) for the hybrid femto access point. For example, both the SID and the NID may be used to identify a given femto access point. In addition, the system selection database may comprise an assigned registration zone for the hybrid femto access point.

In accordance with one or more embodiments and corresponding disclosure thereof, various aspects are described in connection with devices and apparatuses for handing over to a hybrid femto access point that implements multiple RATs, comprising, a first RAT and a second RAT. For example, the apparatus may include a module for detecting a pilot from the hybrid femto access point, wherein the pilot is associated with the first RAT. The apparatus may include a module for registering with the hybrid femto access point on a first channel associated with the first RAT based upon the detected pilot;

In addition, the apparatus may include a module for analyzing a system selection database to identify a second channel associated with the second RAT of the hybrid femto access point. The apparatus may include a module for selecting to handover to the identified second channel.

In related aspects, the apparatus may include a module for detecting the pilot while camped on an initial channel associated with a macro base station. In the alternative, or in addition, the apparatus may include a module for detecting the pilot from one of a co-channel HRPD femto access point and a dedicated-channel HRPD femto access point.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein.

DESCRIPTION

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below.

Single carrier frequency division multiple access (SC-FDMA), which utilizes single carrier modulation and frequency domain equalization is a technique. SC-FDMA has similar performance and essentially the same overall complexity as those of OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for uplink multiple access scheme in 3GPP Long Term Evolution (LTE), or Evolved UTRA.

Figure 1:
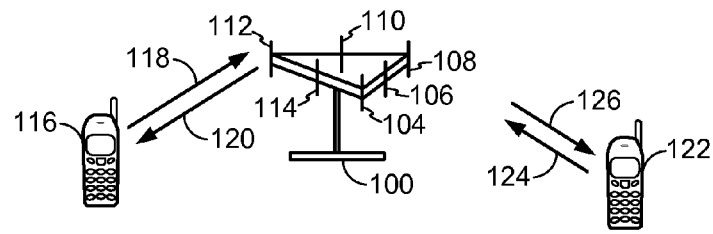
FIG. 1 illustrates a multiple access wireless communication system according to one embodiment.

Referring to FIG. 1, a multiple access wireless communication system according to one embodiment is illustrated. An access point 100 (e.g., base station, Evolved Node B (eNB), or the like) includes multiple antenna groups, one including 104 and 106, another including 108 and 110, and an additional including 112 and 114. In FIG. 1, two antennas are shown for each antenna group, however, more or fewer antennas may be utilized for each antenna group. An Access Terminal 116 (AT) is in communication with the antennas 112 and 114, where the antennas 112 and 114 transmit information to the AT 116 over a forward link 120 and receive information from the AT 116 over a reverse link 118. An AT 122 is in communication with the antennas 106 and 108, where the antennas 106 and 108 transmit information to the AT 122 over a forward link 126 and receive information from the AT 122 over a reverse link 124. In a FDD system, the communication links 118, 120, 124 and 126 may use different frequency for communication. For example, the forward link 120 may use a different frequency then that used by the reverse link 118.

Each group of antennas and/or the area in which they are designed to communicate is often referred to as a sector of the access point. In the embodiment, antenna groups each are designed to communicate to ATs in a sector, of the areas covered by the access point 100.

In communication over the forward links 120 and 126, the transmitting antennas of the access point 100 utilize beamforming in order to improve the signal-to-noise ratio of forward links for the different ATs 116 and 124. Also, an access point using beamforming to transmit to ATs scattered randomly through its coverage causes less interference to ATs in neighboring cells than an access point transmitting through a single antenna to all its ATs.

An access point may be a fixed station used for communicating with the terminals and may also be referred to as an access point, a Node B, an eNB, or some other terminology. An AT may also be referred to as a User Equipment (UE), a wireless communication device, terminal, or the like.

Figure 2:
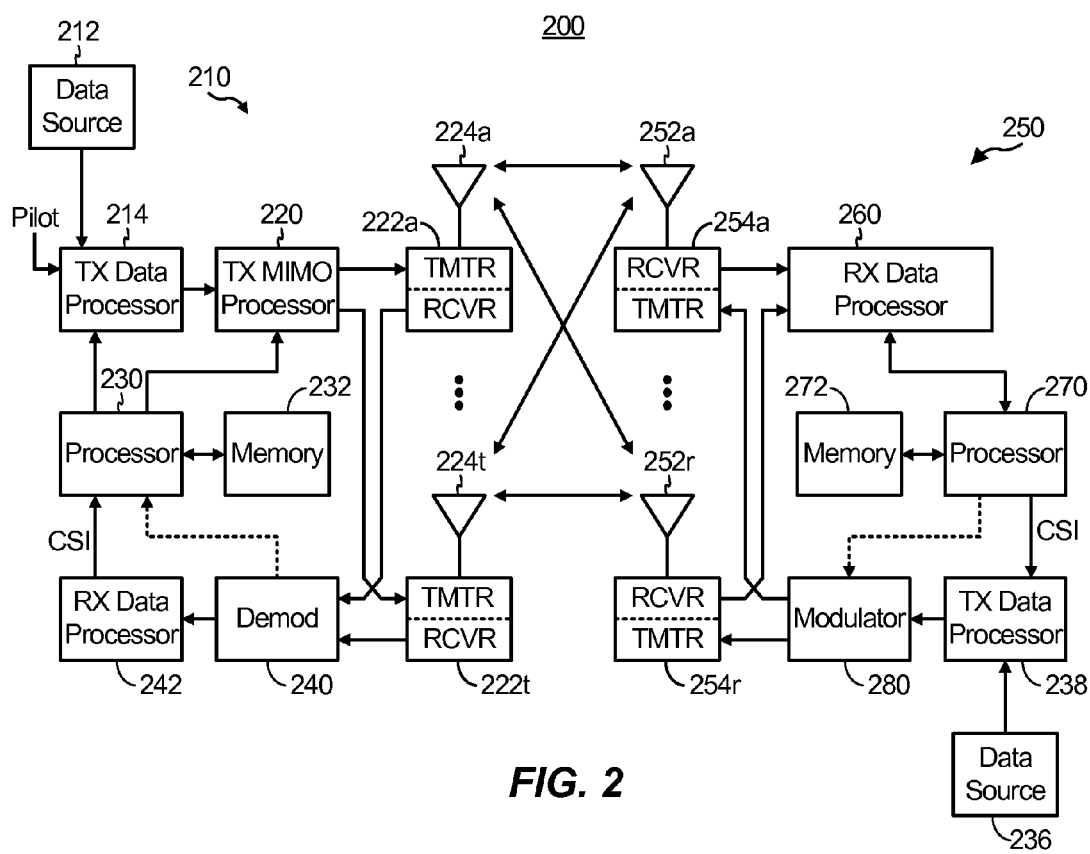
FIG. 2 illustrates a block diagram of a communication system.

FIG. 2 is a block diagram of an embodiment of a transmitter system 210 (also known as the access point) and a receiver system 250 (also known as AT) in a MIMO system 200. At the transmitter system 210, traffic data for a number of data streams is provided from a data source 212 to a transmit (TX) data processor 214.

In an embodiment, each data stream is transmitted over a respective transmit antenna. The TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., Binary Phase Shift Keying (BPSK), Quadrature Phase Shift Keying (QSPK), M-ary Phase-Shift Keying (M-PSK), or Multi-Level Quadrature Amplitude Modulation (M-QAM)) selected for that data stream to provide modulation symbols. The data rate, coding, and modulation for each data stream may be determined by instructions performed by a processor 230.

The modulation symbols for all data streams are then provided to a TX MIMO processor 220, which may further process the modulation symbols (e.g., for OFDM). The TX MIMO processor 220 then provides $N_T$ modulation symbol streams to $N_T$ transmitters (TMTR) 222a through 222t. In certain embodiments, the TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At the receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from the $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by the RX data processor 260 is complementary to that performed by the TX MIMO processor 220 and the TX data processor 214 at the transmitter system 210.

A processor 270 periodically determines which pre-coding matrix to use, discussed further below. The processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to the transmitter system 210.

At the transmitter system 210, the modulated signals from the receiver system 250 are received by the antennas 224, conditioned by the receivers 222, demodulated by a demodulator 240, and processed by a RX data processor 242 to extract the reserve link message transmitted by the receiver system 250. The processor 230 then determines which pre-coding matrix to use for determining the beamforming weights then processes the extracted message.

Figure 3:
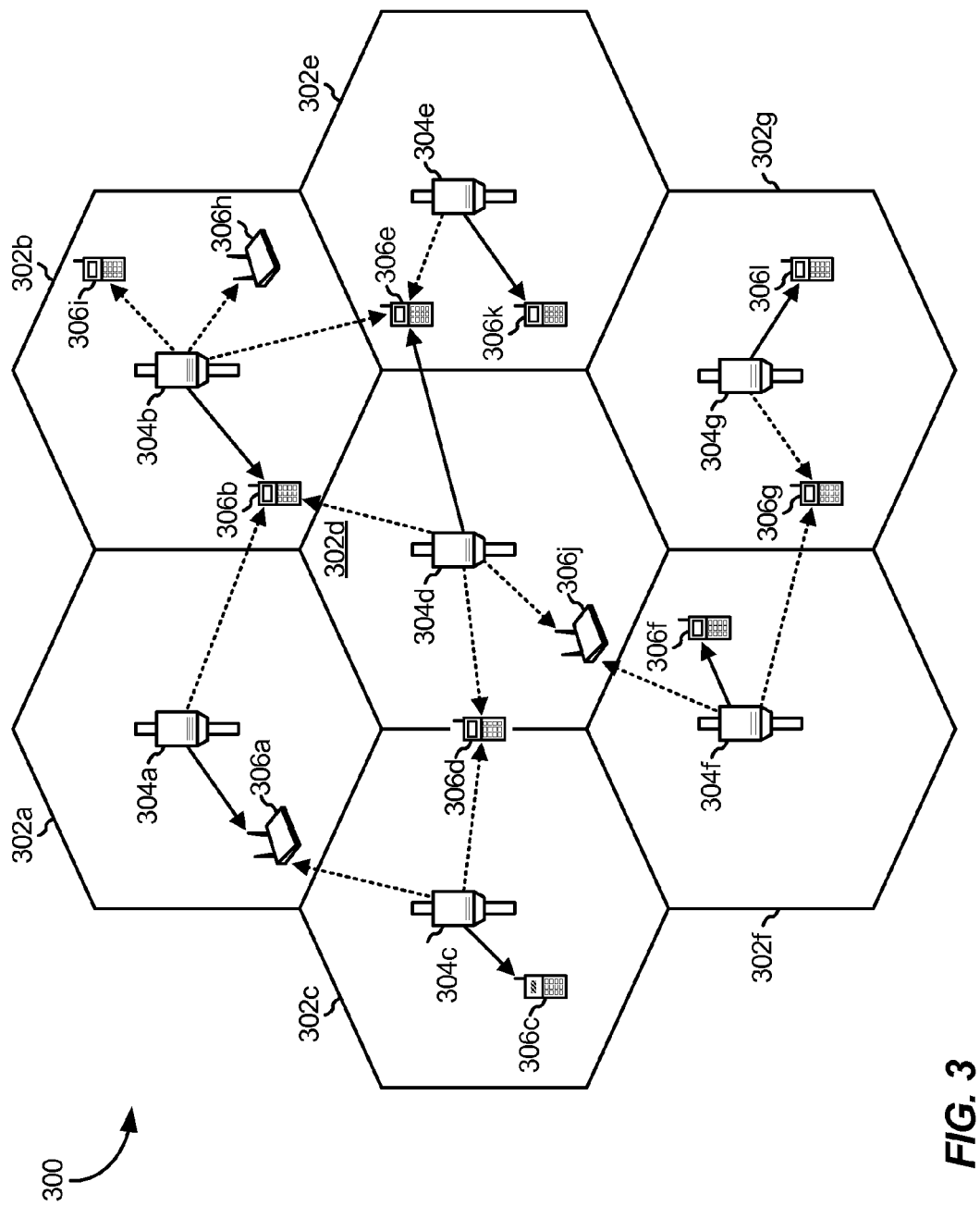
FIG. 3 illustrates an exemplary wireless communication system.

FIG. 3 illustrates an exemplary wireless communication system 300 configured to support a number of users, in which various disclosed embodiments and aspects may be implemented. As shown in FIG. 3, by way of example, the system 300 provides communication for multiple cells 302, such as, for example, macro cells 302a-302g, with each cell being serviced by a corresponding access point (AP) 304 (such as APs 304a-304g). Each cell may be further divided into one or more sectors. Various ATs 306, including ATs 306a-306k, also known interchangeably as UE or mobile stations, are dispersed throughout the system. Each AT 306 may communicate with one or more APs 304 on a forward link (FL) and/or a reverse link (RL) at a given moment, depending upon whether the AT is active and whether it is in soft handoff, for example. The wireless communication system 300 may provide service over a large geographic region, for example, the macro cells 302a-302g may cover a few blocks in a neighborhood.

Figure 4:
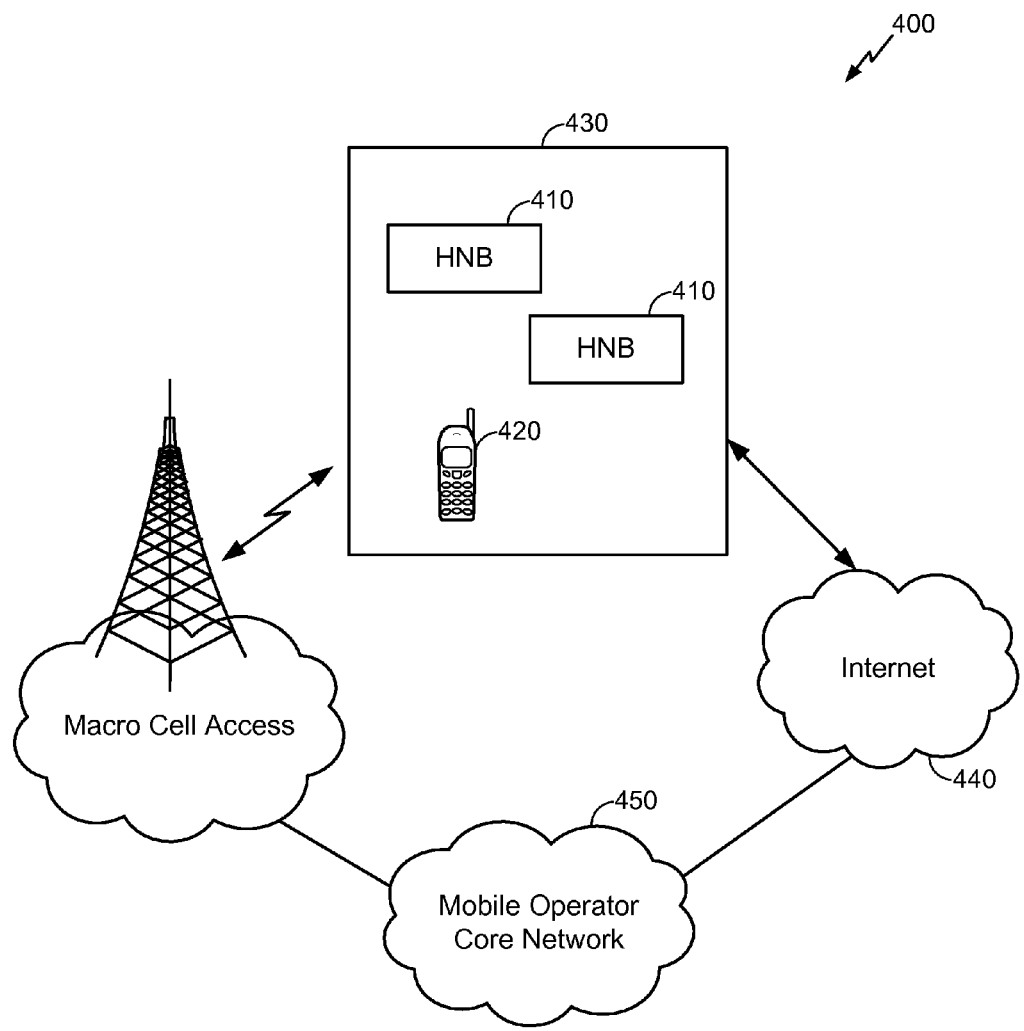
FIG. 4 illustrates an exemplary communication system to enable deployment of access point base stations within a network environment.

FIG. 4 illustrates an exemplary communication system 400 to enable deployment of access point base stations within a network environment. As shown in FIG. 4, the system 400 includes multiple access point base stations or Home Node B units (HNBs) or femto access points, such as, for example, HNBs 410, each being installed in a corresponding small scale network environment, such as, for example, in one or more user residences 430, and being configured to serve an associated, as well as alien, AT 420. Each HNB 410 is further coupled to the Internet 440 and a mobile operator core network 450 via a DSL router (not shown) or, alternatively, a cable modem (not shown).

Although embodiments described herein use 3GPP terminology, it is to be understood that the embodiments may be applied to 3GPP (Rel99, Rel5, Rel6, Rel7) technology, as well as 3GPP2 (1×RTT, 1×EV-DO Rel0, RevA, RevB) technology and other known and related technologies. In such embodiments described herein, the owner of the HNB 410 subscribes to mobile service, such as, for example, 3G mobile service, offered through the mobile operator core network 450, and the AT 420 is capable to operate both in macro cellular environment and in residential small scale network environment. Thus, the HNB 410 is backward compatible with any existing AT 420.

Furthermore, in addition to the macro cell mobile network 450, the AT 420 can be served by a predetermined number of HNBs 410, namely the HNBs 410 that reside within the user's residence 430, and cannot be in a soft handover state with the macro network 450. The AT 420 can communicate either with the macro network 450 or the HNBs 410, but not both simultaneously. As long as the AT 420 is authorized to communicate with the HNB 410, within the user's residence it is desired that the AT 420 communicate with the associated HNBs 410.

In an aspect, logical channels are classified into Control Channels and Traffic Channels. Logical Control Channels comprises Broadcast Control Channel (BCCH) which is DL channel for broadcasting system control information. Paging Control Channel (PCCH) which is DL channel that transfers paging information. Multicast Control Channel (MCCH) which is Point-to-multipoint DL channel used for transmitting Multimedia Broadcast and Multicast Service (MBMS) scheduling and control information for one or several MTCHs. Generally, after establishing RRC connection this channel is used by ATs that receive MBMS (Note: old MCCH+MSCH). Dedicated Control Channel (DCCH) is Point-to-point bi-directional channel that transmits dedicated control information and used by ATs having an RRC connection. In aspect, Logical Traffic Channels comprises a Dedicated Traffic Channel (DTCH) which is Point-to-point bi-directional channel, dedicated to one AT, for the transfer of user information. Also, a Multicast Traffic Channel (MTCH) for Point-to-multipoint DL channel for transmitting traffic data.

In an aspect, Transport Channels are classified into DL and UL. DL Transport Channels comprises a Broadcast Channel (BCH), Downlink Shared Data Channel (DL-SDCH) and a Paging Channel (PCH), the PCH for support of AT power saving (DRX cycle is indicated by the network to the AT), broadcasted over entire cell and mapped to PHY resources which can be used for other control/traffic channels. The UL Transport Channels comprises a Random Access Channel (RACH), a Request Channel (REQCH), an Uplink Shared Data Channel (UL-SDCH) and plurality of PHY channels. The PHY channels comprise a set of DL channels and UL channels.

The DL PHY channels comprises:
Common Pilot Channel (CPICH)
Synchronization Channel (SCH)
Common Control Channel (CCCH)
Shared DL Control Channel (SDCCH)
Multicast Control Channel (MCCH)
Shared UL Assignment Channel (SUACH)
Acknowledgement Channel (ACKCH)
DL Physical Shared Data Channel (DL-PSDCH)
UL Power Control Channel (UPCCH)
Paging Indicator Channel (PICH)
Load Indicator Channel (LICH)
The UL PHY Channels comprises:
Physical Random Access Channel (PRACH)
Channel Quality Indicator Channel (CQICH)
Acknowledgement Channel (ACKCH)
Antenna Subset Indicator Channel (ASICH)
Shared Request Channel (SREQCH)
UL Physical Shared Data Channel (UL-PSDCH)
Broadband Pilot Channel (BPICH)

In an aspect, a channel structure is provided that preserves low PAR (at any given time, the channel is contiguous or uniformly spaced in frequency) properties of a single carrier waveform.

Figure 5:
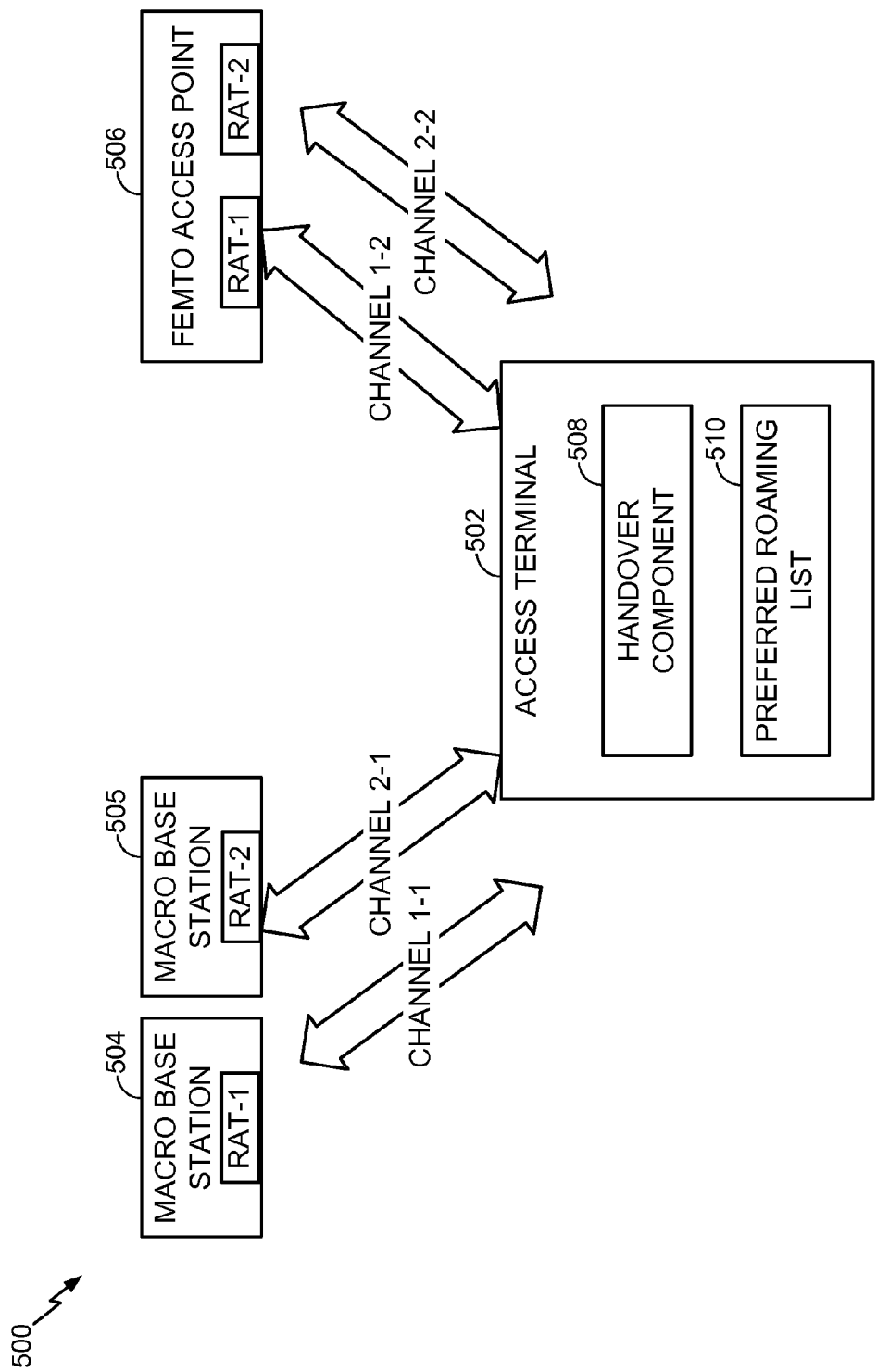
FIG. 5 illustrates an example system that enables idle handoff to a femto access point based on a preferred roaming list in a wireless communication environment.

For the purposes of the present document, the following abbreviations apply:
AM Acknowledged Mode
AMD Acknowledged Mode Data
ARQ Automatic Repeat Request
BCCH Broadcast Control CHannel
BCH Broadcast CHannel
C- Control-
CCCH Common Control CHannel
CCH Control CHannel
CCTrCH Coded Composite Transport Channel
CP Cyclic Prefix
CRC Cyclic Redundancy Check
CTCH Common Traffic CHannel
DCCH Dedicated Control CHannel
DCH Dedicated CHannel
DL DownLink
DSCH Downlink Shared CHannel
DTCH Dedicated Traffic CHannel
FACH Forward link Access CHannel
FDD Frequency Division Duplex
L1 Layer 1 (physical layer)
L2 Layer 2 (data link layer)
L3 Layer 3 (network layer)
LI Length Indicator
LSB Least Significant Bit
MAC Medium Access Control
MBMS Multimedia Broadcast Multicast Service
MCCHMBMS point-to-multipoint Control CHannel
MRW Move Receiving Window
MSB Most Significant Bit
MSCH MBMS point-to-multipoint Scheduling CHannel
MTCH MBMS point-to-multipoint Traffic CHannel
PCCH Paging Control CHannel
PCH Paging CHannel
PDU Protocol Data Unit
PHY PHYsical layer
PhyCHPhysical CHannels
RACH Random Access CHannel
RLC Radio Link Control
RRC Radio Resource Control
SAP Service Access Point
SDU Service Data Unit
SHCCH SHared channel Control CHannel
SN Sequence Number
SUFI SUper FIeld
TCH Traffic CHannel
TDD Time Division Duplex
TFI Transport Format Indicator
TM Transparent Mode
TMD Transparent Mode Data
TTI Transmission Time Interval
U- User-
UE User Equipment
UL UpLink
UM Unacknowledged Mode
UMD Unacknowledged Mode Data
UMTS Universal Mobile Telecommunications System
UTRA UMTS Terrestrial Radio Access
UTRAN UMTS Terrestrial Radio Access Network
MBSFN Multicast Broadcast Single Frequency Network
MCE MBMS Coordinating Entity
MCH Multicast Channel
DL-SCH Downlink Shared Channel
MSCH MBMS Control Channel
PDCCH Physical Downlink Control Channel
PDSCH Physical Downlink Shared Channel FIG. 5 illustrates an example system 500 that enables idle handoff to a femto access point based on system selection database (e.g., AT-assisted information and network-broadcasted information), such as, for example, a Preferred Roaming List (PRL) or the like, in a wireless communication environment. The system 500 may include an AT 502 that can transmit and/or receive information, signals, data, instructions, commands, bits, symbols, and the like. The AT 502 can communicate with a macro base stations 504, 505 via the forward link and/or reverse link. The macro base stations 504, 505 can transmit and/or receive information, signals, data, instructions, commands, bits, symbols, and the like. In related aspects, macro base station 504 comprises a first type of radio access technology (RAT), referred to in FIG. 5 as RAT-1. RAT-1 communication between the AT 502 and the macro base station 504 is on channel 1-1. In further related aspects, macro base station 505 comprises a second type of RAT, referred to as RAT-2. RAT-2 communication between the AT 502 and the macro base station 505 is on channel 2-1.

Further, the AT 502 can communicate with a femto access point 506 via the forward link and/or reverse link. The femto access point 506 may implement a plurality of RATs, such as, for example, RAT-1 and RAT-2. For example, RAT-1 may comprise 1×, GSM, etc., while RAT-2 may comprise High Rate Packet Data (HRPD), LTE, etc. Such a femto access point 506 may be referred to as a hybrid femto access point. RAT-1 communication between the AT 502 and the femto access point 506 is on channel 1-2. RAT-2 communication between the AT 502 and the femto access point 506 is on channel 2-2.

Moreover, although not shown, it is contemplated that any number of ATs similar to the AT 502, any number of macro base stations similar to the macro base stations 504 and 505, and/or any number of femto access points similar to the femto access point 506 can be included in the system 500. In addition, it is noted that use of 3GPP2 terminology (e.g., PRL, 1×, HRPD, System Identifier, Network Identifier) herein is for illustrative purposes only, and that the techniques and methodologies described herein are also applicable to 3GPP and related technologies.

In one exemplary embodiment, the femto access point 506 comprises a hybrid 1×/HRPD femto access point that triggers the AT 502 handoff thereto. For instance, the femto access point 506 can trigger the AT 502 to handoff to the femto access point 506 (e.g., from the macro base station 504 or similar base stations) when the AT 502 is located in a coverage area associated with the femto access point 506. The current practices described below oftentimes separately perform 1× and HRPD handoffs, and can yield various deficiencies.

With respect to current practices for handoff to femto access points, there are three categories of techniques to address the problem of femto cell discovery by ATs. The first category involves beacons, which are more suited to facilitate femto access point discovery with legacy (femto unaware) ATs. The second category involves Preferred User Zone Lists (PUZLs), which are more suited to femto aware ATs. The third category involves new messages, such as an Access Point Identification message (APIDM), which is suited to aid femto-aware ATs in femto access point discovery.

With respect to the current use of beacons for femto access point discovery, when the femto operating frequency is different from neighboring macro cell frequencies, the femto access point may radiate a beacon (i.e., pilot plus some overhead channels) on one or more macro cell frequencies to advertise its presence to an idle or active legacy mobile. For example, a 1× beacon includes standard pilot, paging, and sync channels, while a HRPD beacon includes pilot, MAC and control channels. Upon detecting a beacon pilot that is stronger than the macro pilot as part of routine idle mode intra-frequency pilot searches, the AT performs idle handoff to the beacon and reads it overhead messages.

For example, a current beacon technique would be for a 1×/HRPD femto access point to send a HRPD beacon on a macro HRPD channel. However, transmission of such a beacon may not be preferred for HRPD because hopping a beacon on HRPD in addition to 1× adds cost and complexity to femto access point. Moreover, the number of HRPD channels can be large, thus making effective beacon design difficult at best. Further, additional interference can be generated by the HRPD beacon. Additionally, difficulties associated with ensuring consistent behavior with two beacons can result due to the deployment of different technologies. Moreover, the foregoing can fail to work with legacy ATs.

With respect to the current use of a PUZL or the like for femto access point discovery, the PUZL is basically a database that resides in the AT and defines a list of user zones within the macro network where the AT can search and find specific AP base stations. Each user zone may be defined using geographical (GEO) information (e.g., latitude and longitude) and/or RF coverage characteristics of the macro network around the femto access point.

With respect to the use of messages, such as, for example, APIDM for femto access point discovery, these messages may be broadcast overhead messages that convey the unique identifier of the femto access point, handoff supplementary information for active call hand-in, location information, and access control association type (restricted/open/signaling). It also contains complimentary air-interface information to assist discovery of the other radio interface, e.g., 1×APIDM also contains HRPD channel and PN information of the hybrid 1×/HRPD femto access point.

Currently, an AT can be associated with the following behavior while in hybrid mode. The AT can have a single transmit/receive (TX/RX). Further, the AT can switch to monitor the 1× system periodically when camping on HRPD. The paging cycles for HRPD can be chosen based on 1× Slot Cycle Index (SCI) operation to avoid overlap. When overlap does occur, 1× can be preferred. Moreover, when in traffic over HRPD, the AT can perform Data Rate Control (DRC) ramp down before proceeding to monitor the 1× system during hybrid operation.

Moreover, an AT can operate in Simultaneous Hybrid Dual Receiver (SHDR) mode. As such, the AT can have a single TX and dual RX. When in-traffic on HRPD, the AT can lose the receive diversity operation over the HRPD system and use the secondary chain to monitor the 1× page. For regular SHDR, the AT can use the primary chain to read both the HRPD and 1× pages with a configuration chosen for the two paging cycles to not overlap. Moreover, for full-time SHDR, the AT can use the primary chain to monitor the HRPD pages and the secondary chain to monitor the 1× pages.

In accordance with aspects of the embodiments described herein, there is provided a system that supports idle hand-in for a hybrid femto access point (that supports multiple RATS, comprising a first RAT and a second RAT) without the need for adding a beacon for the second RAT. With reference to the embodiment of FIG. 5, for RAT-1, the hybrid femto access point 506 may transmit a beacon on channel 1-2 to help the AT 502 detect the hybrid femto access point 506. The provision of a system selection database (e.g., preferred roaming list 510 or the like) on the AT 502 with information regarding channel(s) associated with RAT-2 avoids relying on the hybrid femto access point 506 to transmit a beacon on channel 2-2.

For example, in one embodiment, the hybrid femto access point 506 comprises a hybrid 1×/HRPD femto access point. The preferring roaming list 510 can be configured for supporting HRPD idle hand-in, which can be universal and not per-subscriber specific. More generally, the system 500 can support idle hand-in for a hybrid femto access point that implements a first RAT (e.g., 1×) and a second RAT (e.g., HRPD). The 1× and HRPD handoffs can be performed separately. Further, if an HRPD carrier of the femto access point 506 is on a different channel (e.g., channel 2-2) than macro base station 505 (e.g., channel 2-1), then the AT 502 can detect and move to camp on the femto access point 506 when the AT 502 is near the femto access point 506.

The AT 502 can include a handover component 508 and a PRL 510. The handover component 508 can enable hand-in to the hybrid 1×/HRPD femto access point 506 (e.g., from the macro base station 504 or the like). Moreover, the PRL 510 can be retained in memory (not shown) of the AT 502. The PRL 510 can be provisioned to trigger the AT 502 to discover a HRPD pilot of the femto access point 506 after the AT 502 has found the 1× pilot for the same femto access point 506.

By leveraging the PRL 510 to trigger hand-in by the handover component 508, various benefits can be yielded. For instance, the solution provided by the system 500 need not require the femto access point 506 to send an HRPD beacon, thereby reducing cost and complexity of the femto access point 506. Moreover, use of the PRL 510 can be leveraged with existing legacy handsets (e.g., the AT 502 or the like). Further, the PRL 510 configuration can be system-wide and need not require per-user and/or per-femtocell configuration.

It is noted that the description herein of a hybrid femto access point that supports 1× and HRPD is merely illustrative, and that the hybrid femto access point may support other RATs. For example, a given wireless communication system may include a hybrid femto access point that supports a first RAT (e.g., GSM or the like), as well as a second RAT (e.g., LTE or the like). In the alternative, or in addition, the hybrid femto access point may support a third RAT, fourth RAT, etc. The technique described herein may leverage a GSM/LTE femto access point that sends a pilot associated with GSM. A given AT within the coverage area of the GSM/LTE femto access point may detect the GSM pilot and register with the GSM/LTE femto access point on a first channel associated with GSM based upon the detected GSM pilot. GSM and HRPD handoff may be performed separately. As explained in further detail below, the given AT may analyze a system selection database to identify a second channel associated with the second RAT (e.g., LTE, HRPD, etc.) and select to handover to the identified second channel.

It is further noted that at least one of the RATs implemented on the hybrid femto access point could serve as the anchor to help the AT find the remaining RATs without a beacon In lieu of such a beacon, AT-assisted information or network-broadcasted information, for example, on the anchor, such as 1×, GSM, etc.

The 1×/HRPD AT 502 can employ system selection via employing a system selection database or list, such as, for example, the PRL 510. For each 1× system record, there can be a list of preferred HRPD subnets. A SubnetMask (for subnetID derivation) in the PRL 510 can be shorter than the one in overhead SectorParameters messages. This can allow multiple HRPD access nodes (ANs) to be listed under the same entry in the PRL 510. Moreover, 1× systems (macro and femto), even when listed with the same preference (System Identifier (SID) with a wildcard Network Identifier (NID)) can allow for finding the femto 1× through redirection. For instance, after redirection, the AT 502 can stay on the redirected channel. However, this cannot be relied upon for HRPD. Additionally, during system scan, the AT 502 can switch to a new HRPD carrier under one of the following conditions: 1) an associated HRPD subnetID is listed with higher priority in the PRL 510; and/or 2) associated system descriptions are more specific (e.g., restrictive) system descriptions than the current system descriptions.

Following are various example idle hand-in scenarios. It is to be appreciated, however, that the claimed subject matter is not limited to the following example scenarios.

The femto access point 506 can be a co-channel HRPD femto. When an idle AT 502 is in vicinity of femto coverage, a strong HRPD pilot from the femto access point 506 can trigger the AT 502 to decode QuickConfig and Sector Parameters messages. Upon seeing the subnet from the femto access point 506 being different from the subnet from the macro base station 504, the AT 502 (e.g., the handover component 508 or the like) can send a UATIRequest to trigger hand-in to the femto access point 506. This can be either before or after 1× registration as the HRPD hand-in process can be independent of the 1× hand-in process. Moreover, the HRPD subnet for the femto access point 506 can lie within the macro HRPD subnet entry in the PRL 510 to avoid inter-frequency search for better HRPD system. According to an illustration, if an entry in the PRL 510 for the macro base station 504 has subset listed as 1011xxxxxx, then femto access point HRPD subset set to 101110xxxxxx will not trigger better HRPD system search after handing off to the femto access point 506, whereas 111111xxxx will.

According to another example, the femto access point 506 can be a dedicated-channel HRPD femto. When the AT 502 is in vicinity of femto coverage, the 1× beacon can trigger the AT 502 to register with femto base station 506 on 1×. Based on the PRL 510, there can be an entry that matches a 1× system on the femto access point 506 better; thus, when an inter-frequency scan occurs (e.g., through femto-specific acquisition record or better system reselection or the like), the AT 502 can reselect its HRPD frequency to femto frequency as its subset matches the most preferred entry. Accordingly, the PRL 510 can be universal for all (or most) ATs. Following are various examples of possible structures for the PRL 510.

By way of example, the PRL 510 can leverage dedicated SID for femto systems. A femto system (e.g., the femto access point 506 or the like) can be assigned a different SID as compared to a macro system (e.g., macro base station 504 or the like). The femto system can be associated with a same priority as the macro system to prevent excessive scanning when the AT 502 is on macro. Moreover, NID can be wildcarded. Accordingly, as AT 502 performs 1× registration on femto access point 506, then the AT 502 can prefer Subnet (Femto) to Subnet(Macro) as there is an entry corresponding to SID for the femto access point. Subnet(Femto) should be such that macro base station 504 does not match the entry. According to an example, Subnet(Macro) can be 1011xxxx and all macro base stations (e.g., including the macro base station 504 or the like) in system 500 can have Subnet set to 10111xxxxx. Following this example, Subnet(Femto) can be 10110xxxxx. According to the foregoing example, PRL 510 can include the following entries.

| Priority | SID | NID | Associated DO | Acq Index |
|---|---|---|---|---|
| 0 (same as next) | SID(Femto) | * | Subnet(Femto) | Femto Acq |
| 1 (higher than next) | SID(Macro) | * | Subnet(Macro) | Femto Acq |

Pursuant to another example, the PRL 510 can employ NIDs for femto systems. A femto system (e.g., the femto access point 506 or the like) can be assigned one NID. This entry can have the same priority as a macro network entry to prevent excessive scanning when the AT 502 is on macro. Moreover, SID can be the same for femto and macro systems. As the AT 502 performs 1× registration on the femto access point 506, then AT 502 can prefer Subnet(Femto) over Subnet (Macro) as the AT 502 finds an entry which matches both SID and NID on the femto access point 506. Accordingly, a more specific description can override a generic description as set forth above. Moreover, settings of Subnet(Macro) and Subnet (Femto) can be similar to the above example. In accordance with the above example, PRL 510 can include the following entries.

| Priority | SID | NID | Associated DO | Acq Index |
|---|---|---|---|---|
| 0 (same as next) | SID(Common) | NID1(Femto) | Subnet(Femto) | Femto |
| 0 (same as next) | SID(Common) | NID2(Femto) | Subnet(Femto) | Femto |
| 1 (higher than next) | SID(Common | * | Subnet(Macro) | Macro |

Utilization of femto specific NIDs can yield the following impact. To trigger the AT 502 to perform 1× registration when AT 502 performs idle handoff to a new pilot which may be a neighboring femto access point (e.g., the femto access point 506 or the like), neighboring femto access points can advertise different registration zones and use zone-based registration. Alternatively, when a Femtocell Convergence Server (FCS)/Mobile Switching Center (MSC) needs to page the AT 502, it can page all femto access points with the same NID and registration zone in the area (e.g., maybe under the same macro cell). Thus, there may be no need for registration zone planning/reuse. Further, if the AT 502 moves directly from femto access point to femto access point with the same registration zone or zone-based registration not being used, it does not have to register (e.g., thus saving battery life, solving the ping-pong problem or the like) and can receive pages from both femto access points.

Figure 6:
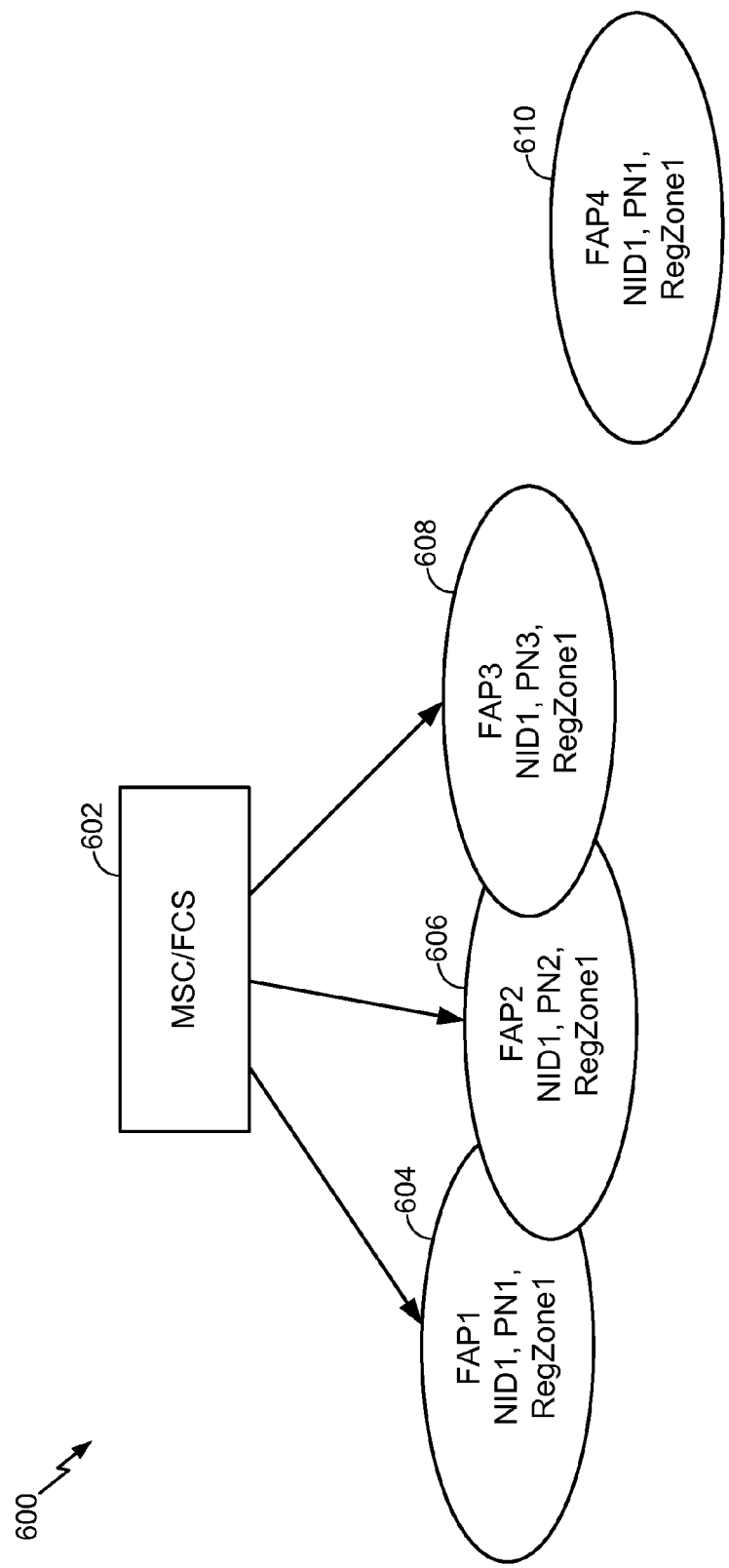
FIG. 6 illustrates an example system that lacks zone-based registration or employs one registration zone for femto access points in a wireless communication environment.

Turning to FIG. 6, illustrated is an example system 600 that lacks zone-based registration or employs one registration zone for femto access points in a wireless communication environment. The system 600 includes the MSC/FCS 602 and four femto access point (FAPs) (e.g., FAP 1 604, FAP 2 606, FAP 3 608, and FAP 4 610); however, it is to be appreciated that the claimed subject matter is not so limited.

With no zone-based registration or one registration zone assigned for each FAP 604-610, MSC/FCS 602 can perform 1× paging for all FAPs 604-610 in the area that can have overlapping coverage. As shown, FAP 1 604, FAP 2 606, and FAP 3 608 can have overlapping coverage and can be separate from coverage of FAP 4 610. Thus, the MSC/FCS 602 can send page FAP 1 604, FAP 2 606, and FAP 3 608 together (e.g., since these FAPs 604-608 are overlapping and have the same NID or similar identifier).

Figure 7:
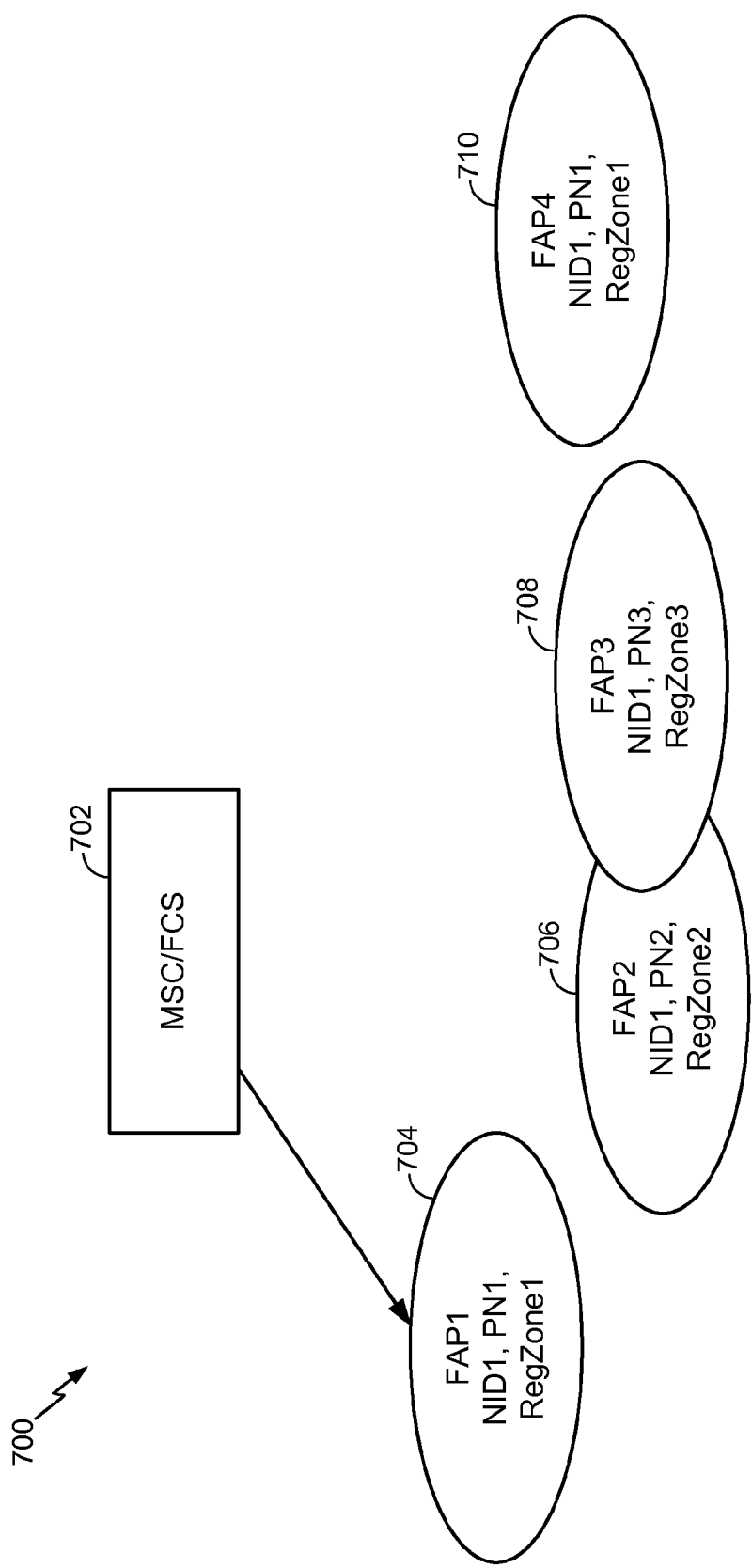
FIG. 7 illustrates an example system that employs multiple registration zones for femto access points in a wireless communication environment.

Now referring to FIG. 7, illustrated is an example the system 700 that employs multiple registration zones for femto access points in a wireless communication environment. The system 700 includes the MSC/FCS 702 and four FAPs (e.g., FAP 1 704, FAP 2 706, FAP 3 708, and FAP 4 710); however, it is to be appreciated that the claimed subject matter is not so limited.

Registration zones can be reused in the same manner that PN offsets are reused. Further, no two FAPs of the same registration zone can have overlapping coverage. Moreover, the MSC/FCS 702 can send a 1× page directed to a FAP where an AT was last registered; as shown, the MSC/FCS 702 can send a page to FAP 704.

Turning again to FIG. 5, impact of the techniques described herein on the PRL 510 size can be considered. The maximum size of a HRPD system row entry can be 23 bytes and for a 1× row entry can be 8 bytes (with specific NID) or 6 bytes (with wildcard NID). Assuming that a current PRL has G geographical areas (GEOs) and a new entry is added to each of the GEOs, then the maximum additional memory needed in a system record portion in the PRL 510 can be: G*(23+8) bytes for the NID approach or G*(23+6) bytes for the SID approach. Moreover, there would likely be no additional memory needed for the acquisition record portion of the PRL 510 (e.g., if a new acquisition record is needed and defined for femto access points).

Moreover, hand-in behavior of the AT 502 for dedicated HRPD channel the femto access point 506 can be as follows. When the AT 502 sees a beacon on the 1× channel, it can be redirected to the 1× femto channel. When idle on both 1× and HRPD, the AT 502 can acquire the 1× femto and proceed to find the associated HRPD system. If the AT 502 is connected on HRPD, the following can be effectuated. For hybrid mode, the AT 502 can abandon the HRPD connection and can enter out-of-service for HRPD. The AT 502 can subsequently acquire the associated HRPD system (e.g., associated with the 1× femto access point or the like) after performing 1× registration with the femto access point 506. For SHDR mode, the AT 502 can acquire the 1× femto, perform DRC ramp down, then register with the 1× femto. If the AT 502 is able to return to the macro HRPD system after completing the 1× registration within a supervision timer (e.g., 5 seconds or other defined time period), the AT 502 can return to the macro HRPD system. The AT 502 can reselect to HRPD channel on femto access point 506 after the HRPD connection terminates. Moreover, if it takes longer than 5 seconds to return back to the HRPD system, the AT 502 can abandon the HRPD connection and can subsequently attempt to find the femto associated HRPD system.

Figure 8:
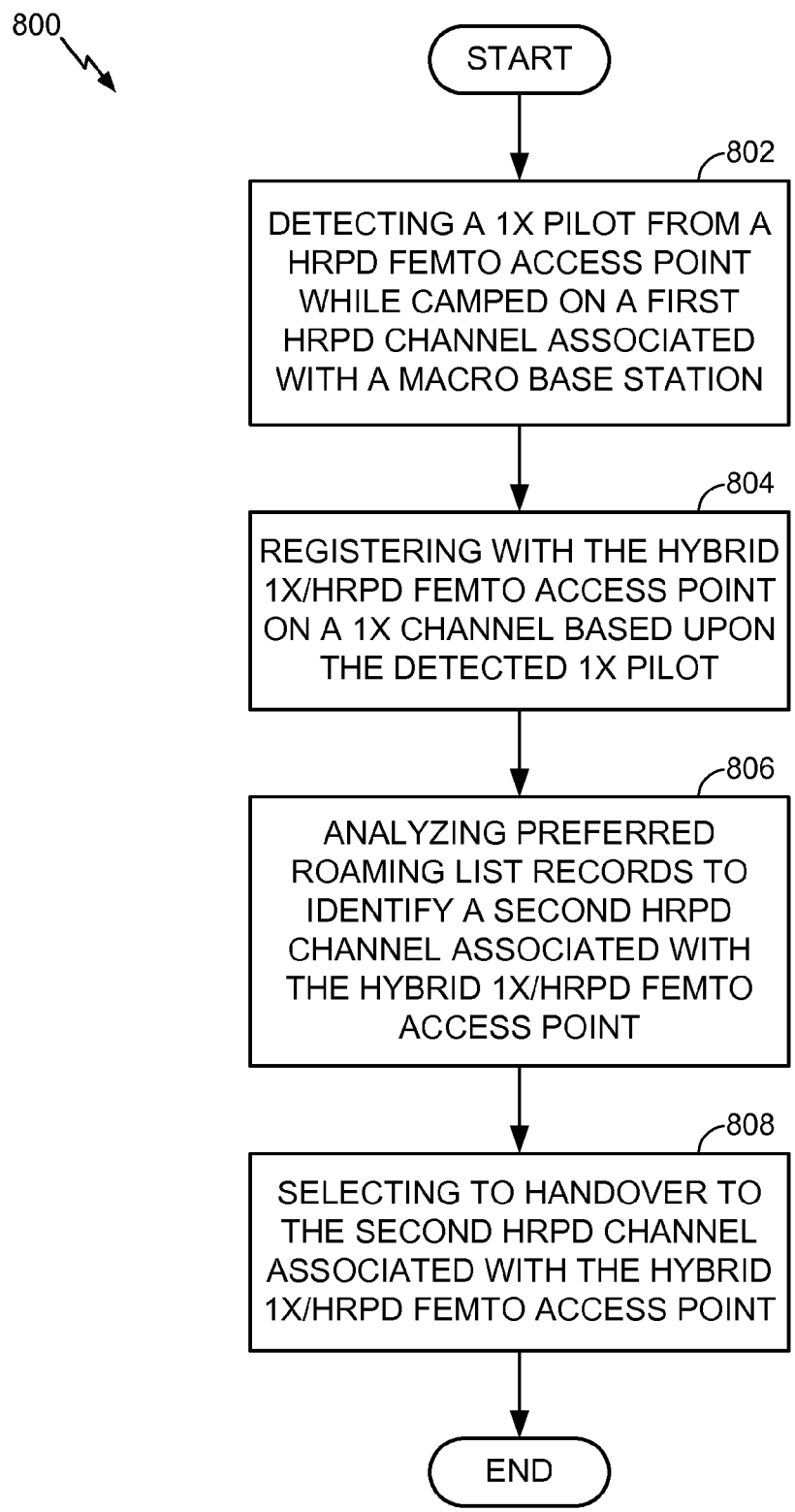
FIG. 8 illustrates an example methodology for facilitating handing over in a wireless communication environment.

Referring to FIG. 8, a methodology relating to idle handoff to a femto cell in a wireless communication environment is illustrated. While, for purposes of simplicity of explanation, the methodology is shown and described as a series of acts, it is to be understood and appreciated that the methodology is not limited by the order of acts, as some acts can, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts can be required to implement a methodology in accordance with one or more embodiments.

With reference to FIG. 8, illustrated is a methodology 800 that facilitates handing over in a wireless communication environment. At 802, a 1× pilot from a hybrid 1×/HRPD femto access point can be detected while camped on a first HRPD channel associated with a macro base station. At 804, registration with the hybrid 1×/HRPD femto access point on a 1× channel can be effectuated based upon the detected 1× pilot. At 806, PRL records can be analyzed to identify a second HRPD channel associated with the hybrid 1×/HRPD femto access point. At 808, a selection to handover to the second HRPD channel associated with the hybrid 1×/HRPD femto access point can be effectuated.

Figure 9:
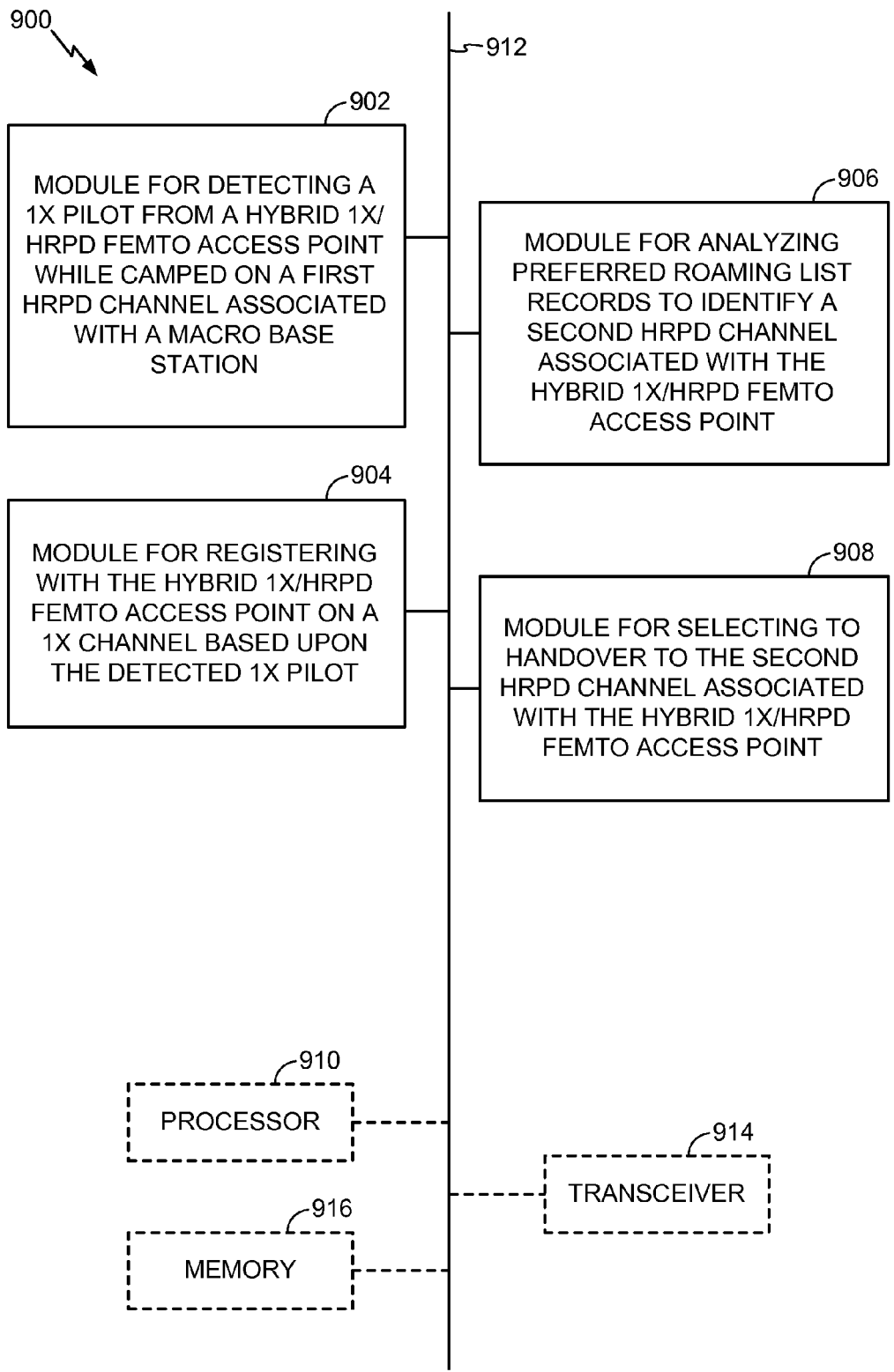
FIG. 9 shows an exemplary apparatus that facilitates handing over in a wireless communication environment.

In accordance with one or more aspects of the embodiments described herein, there are provided devices and apparatuses for handing over in a wireless communication environment. With reference to FIG. 9, there is provided an exemplary apparatus 900 that may be configured as a communication device or as a processor or similar device for use within the communication device. As depicted, the apparatus 900 may include functional blocks that can represent functions implemented by a processor, software, or combination thereof (e.g., firmware).

As illustrated, the apparatus 900 may comprise an electrical component or the module 902 for detecting a 1× pilot from a hybrid 1×/HRPD femto access point while camped on a first HRPD channel associated with a macro base station. The apparatus 900 may comprise a module 904 for registering with the hybrid femto access point on a first channel associated with the first RAT based upon the detected pilot. The apparatus 900 may comprise a module 906 for analyzing a system selection database to identify a second channel associated with the second RAT of the hybrid femto access point. The apparatus 900 may comprise a module 908 for selecting to handover to the identified second channel.

It is noted that the apparatus 900 may optionally include a processor module 910 having at least one processor, in the case of the apparatus 900 configured as a communication network entity, rather than as a processor. The processor 910, in such case, may be in operative communication with the modules 902-908 via a bus 912 or similar communication coupling. The processor 910 may effect initiation and scheduling of the processes or functions performed by electrical components 902-908.

In related aspects, the apparatus 900 may include a transceiver module 914. A stand alone receiver and/or stand alone transmitter may be used in lieu of or in conjunction with the transceiver 914. In further related aspects, the apparatus 900 may optionally include a module for storing information, such as, for example, a memory device/module 916. The computer readable medium or the memory module 916 may be operatively coupled to the other components of the apparatus 900 via the bus 912 or the like. The memory module 916 may be adapted to store computer readable instructions and data for effecting the processes and behavior of the modules 902-908, and subcomponents thereof, or the processor 910, or the methods disclosed herein. The memory module 916 may retain instructions for executing functions associated with the modules 902-908. While shown as being external to the memory 916, it is to be understood that the modules 902-908 can exist within the memory 916.

Figure 10:
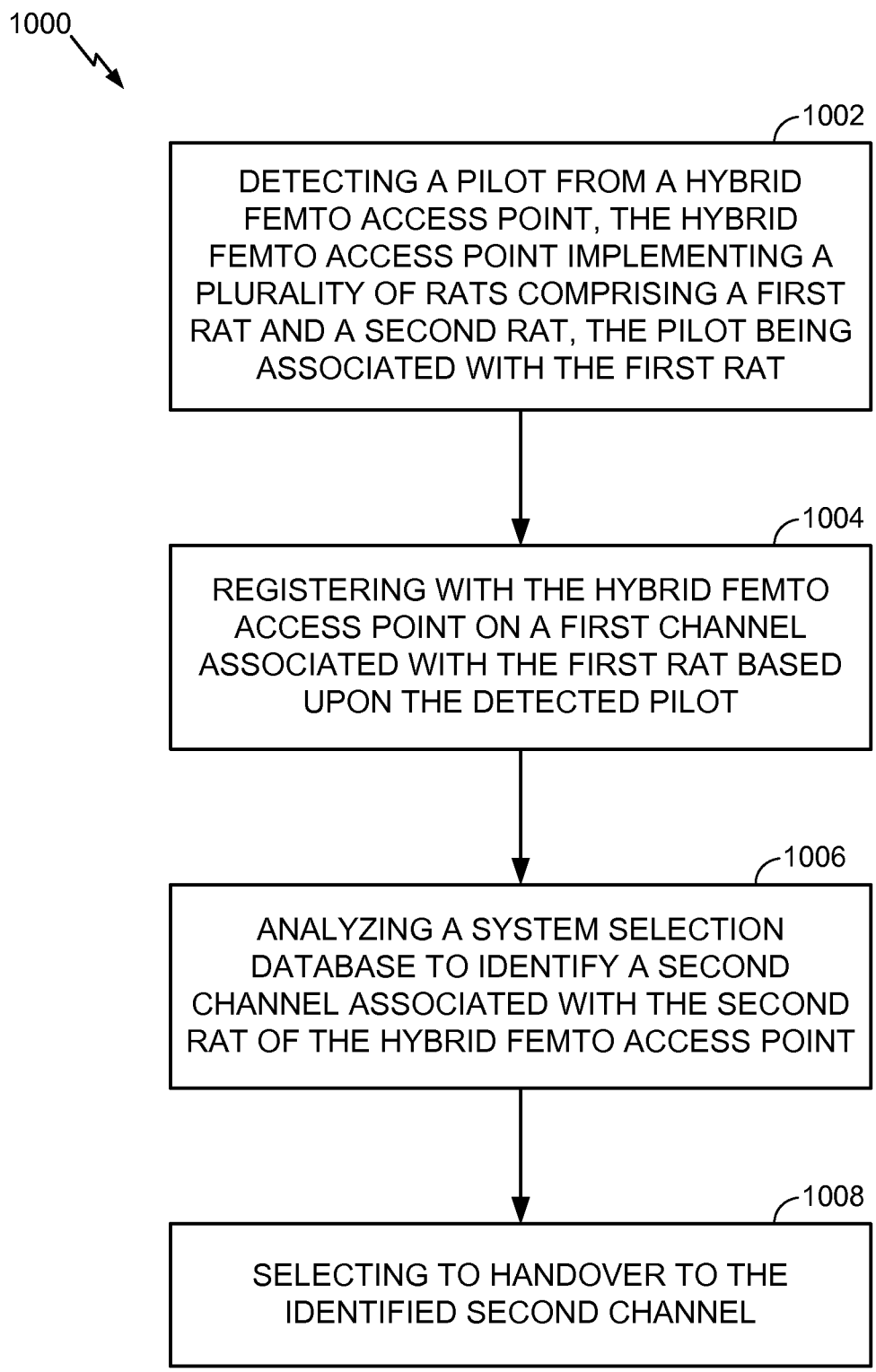
FIG. 10 illustrates an example methodology for handing over to a hybrid femto access point.

In accordance with one or more aspects of the embodiments described herein, there is provided a method for idle hand-in to a femto access point. With reference to FIG. 10, there is shown a methodology 1000 that facilitates handing over to a hybrid femto access point that implements a plurality of RATs comprising, for example, a first RAT and a second RAT. At 1002, a pilot from a hybrid femto access point may be detected, wherein the hybrid femto access point may implement a first RAT and a second RAT, the pilot being associated with the first RAT. At 1004, registration with the hybrid femto access point on a first channel associated with the first RAT may be effectuated based upon the detected pilot. At 1006, a system selection database may be analyzed to identify a second channel associated with the second RAT of the hybrid femto access point. At 1008, a selection to handover to the identified second channel may be effectuated.

Figure 11:
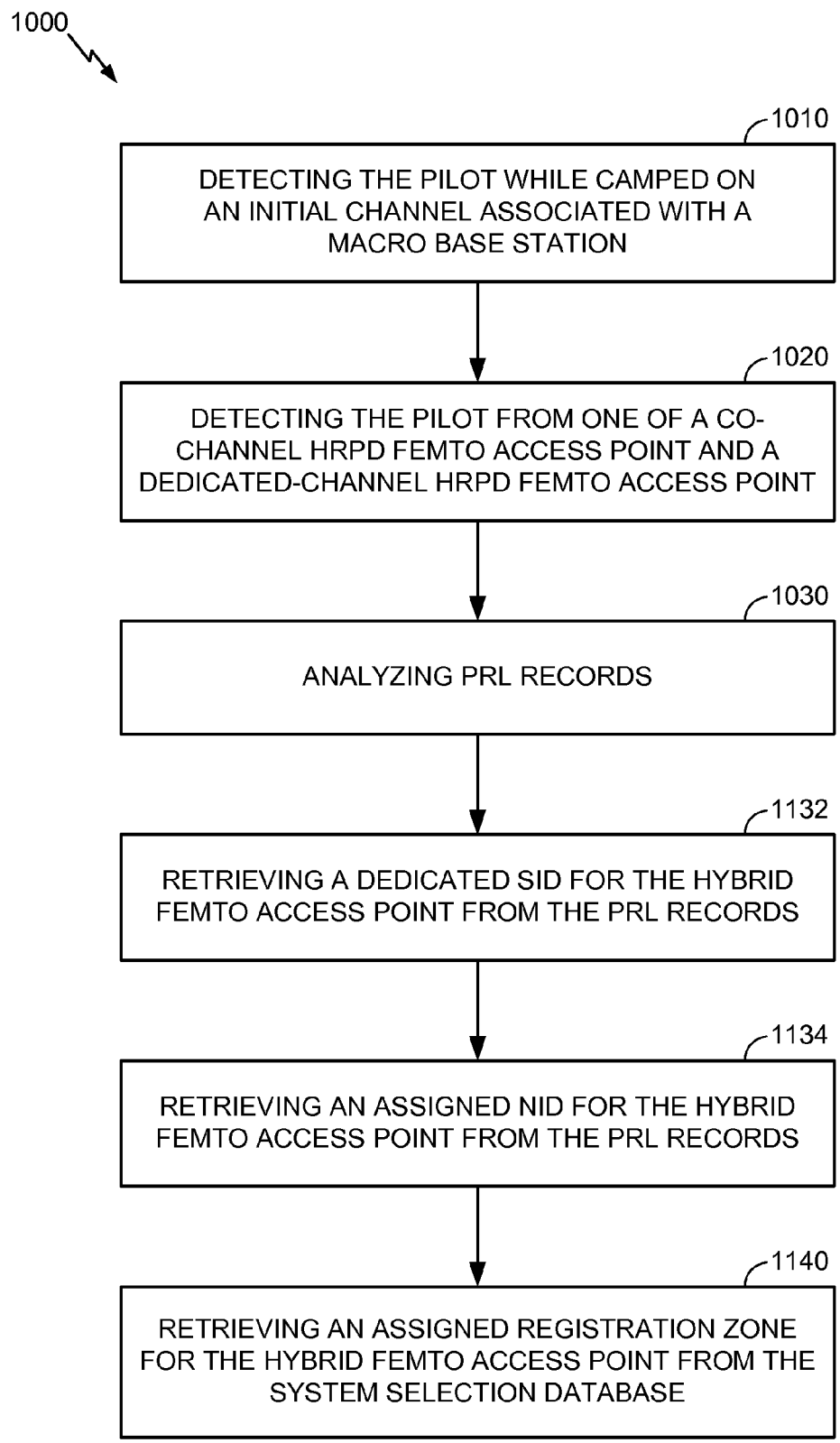
FIG. 11 illustrates further aspects of the methodology of FIG. 10.

With reference to FIG. 11, the method 1000 may involve, at 1010, detecting the pilot while camped on an initial channel associated with a macro base station. The method 1000 may involve, at 1020, detecting the pilot from one of a co-channel HRPD femto access point and a dedicated-channel HRPD femto access point.

In one embodiment, the method 1000 may involve, at 1030, analyzing PRL records. At 1032, a dedicated SID for the hybrid femto access point may be retrieved from the PRL records. In the alternative, or in addition, at 1034, an assigned NID for the hybrid femto access point may be retrieved from the PRL records. In related aspects, at 1040, an assigned registration zone for the hybrid femto access point may be retrieved from the system selection database. In further related aspects, the system selection database may comprise AT-assisted information, network-broadcasted information, or combinations thereof.

Figure 12:
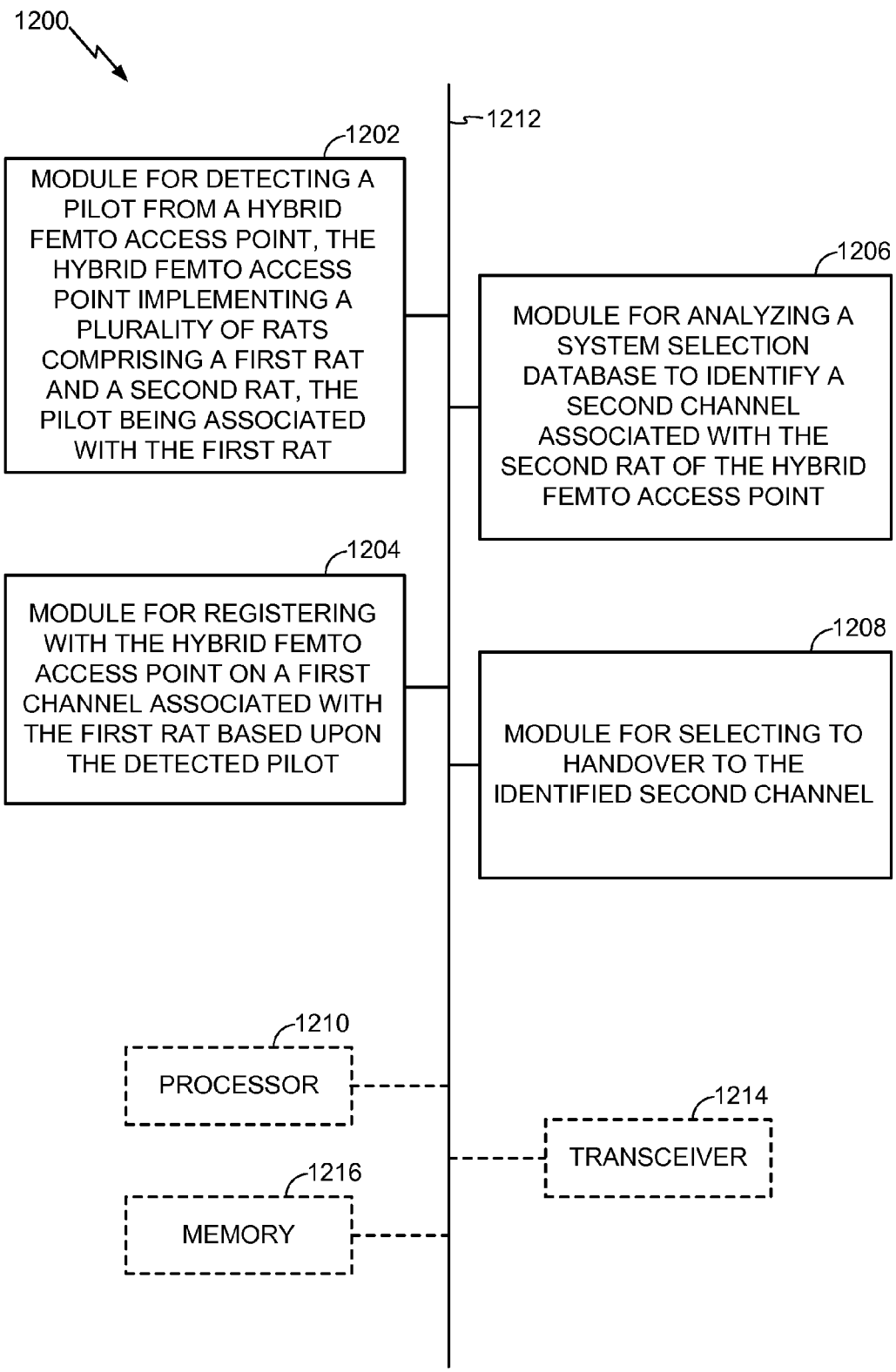
FIG. 12 shows an exemplary apparatus for handing over to a hybrid femto access point.

In accordance with one or more aspects of the embodiments described herein, there are provided devices and apparatuses for idle hand-in to a femto access point. With reference to FIG. 12, there is provided an exemplary apparatus 1200 that may be configured as a communication device or as a processor or similar device for use within the communication device. As depicted, the apparatus 1200 may include functional blocks that can represent functions implemented by a processor, software, or combination thereof (e.g., firmware).

As illustrated in FIG. 12, the apparatus 1200 may comprise an electrical component or the module 1202 for detecting a pilot from a hybrid femto access point, the hybrid femto access point implementing a plurality of RATs comprising a first RAT and a second RAT, the pilot being associated with the first RAT. The apparatus 1200 may comprise a module 1204 for registering with the hybrid femto access point on a first channel associated with the first RAT based upon the detected pilot. The apparatus 1200 may comprise a module 1206 for analyzing a system selection database to identify a second channel associated with the second RAT of the hybrid femto access point. The apparatus 1200 may comprise a module 1208 for selecting to handover to the identified second channel.

Figure 13:
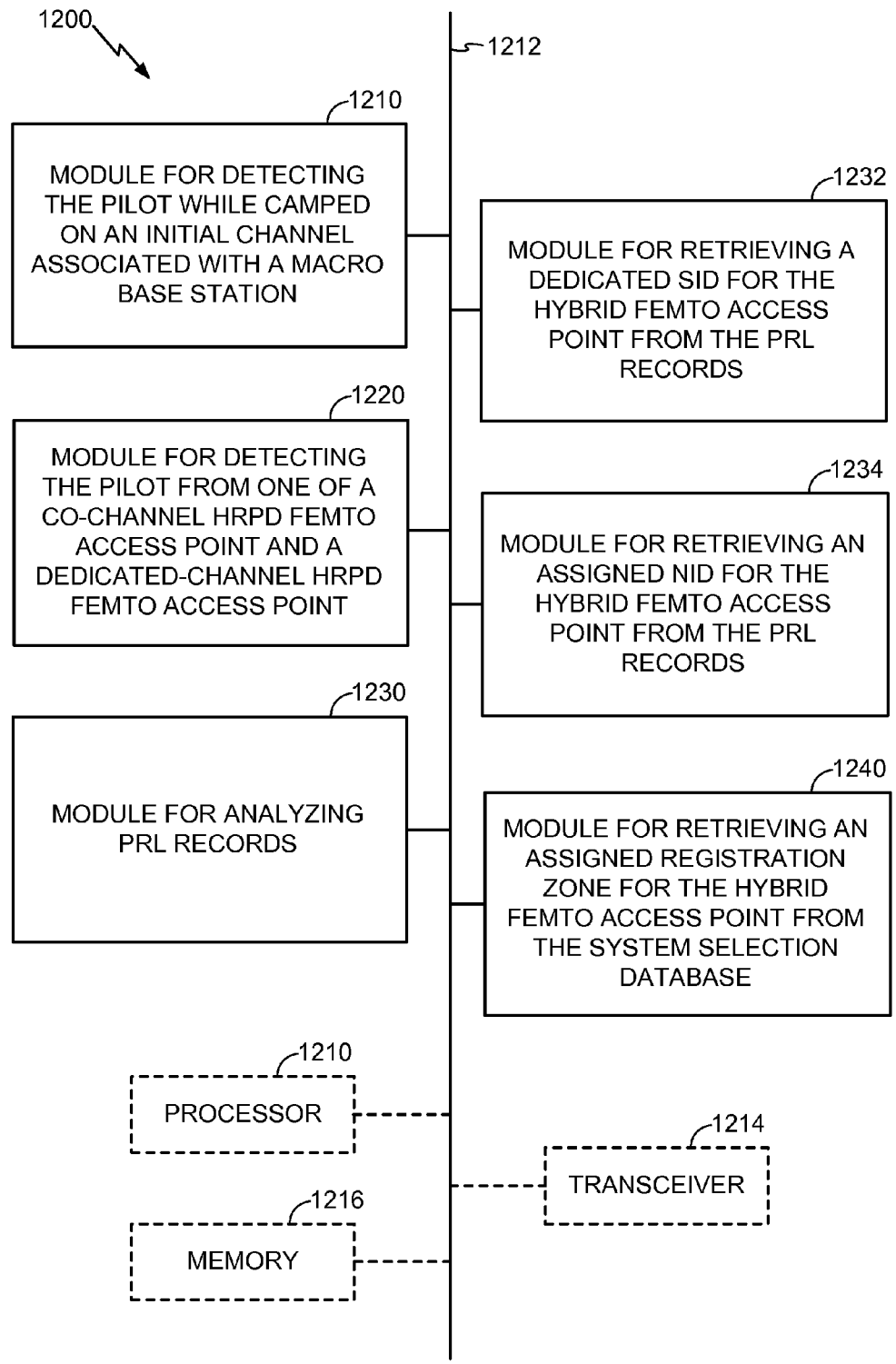
FIG. 13 shows further aspects of the methodology of FIG. 12.

With reference to FIG. 13, the module 1202 may comprise a module 1210 for detecting the pilot while camped on an initial channel associated with a macro base station. In the alternative, or in addition, the module 1202 may comprise a module 1220 for detecting the pilot from one of a co-channel HRPD femto access point and a dedicated-channel HRPD femto access point.

In one embodiment, the module 1206 may comprise a module 1230 for analyzing PRL records. The module 1230 may further comprise a module 1232 for retrieving a dedicated SID for the hybrid femto access point from the PRL records. In the alternative, or in addition, the module 1230 may comprise a module 1234 for retrieving an assigned NID for the hybrid femto access point from the PRL records. In related aspects, the apparatus 1200 may comprise a module 1240 for retrieving an assigned registration zone for the hybrid femto access point from the system selection database.

With reference to FIGS. 12-13, the apparatus 1200 may optionally include a processor module 1210 having at least one processor, in the case of the apparatus 1200 configured as a communication network entity, rather than as a processor. The processor 1210, in such case, may be in operative communication with the modules 1202-1240 via a bus 1212 or similar communication coupling. The processor 1210 may effect initiation and scheduling of the processes or functions performed by electrical components 1202-1240.

In related aspects, the apparatus 1200 may include a transceiver module 1214. A stand alone receiver and/or stand alone transmitter may be used in lieu of or in conjunction with the transceiver 1214. In further related aspects, the apparatus 1200 may optionally include a module for storing information, such as, for example, a memory device/module 1216. The computer readable medium or the memory module 1216 may be operatively coupled to the other components of the apparatus 1200 via the bus 1212 or the like. The memory module 1216 may be adapted to store computer readable instructions and data for effecting the processes and behavior of the modules 1202-1240, and subcomponents thereof, or the processor 1210, or the methods disclosed herein. The memory module 1216 may retain instructions for executing functions associated with the modules 1202-1240. While shown as being external to the memory 1216, it is to be understood that the modules 1202-1240 can exist within the memory 1216.

It will be appreciated that, in accordance with one or more aspects described herein, inferences can be made regarding handing off to a hybrid 1x/HRPD femto access point by leveraging a PRL. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A method used in a wireless communication system, the method comprising:
    detecting a pilot signal from a hybrid femto access point, the hybrid femto access point implementing a plurality of radio access technologies (RATs) comprising a first RAT and a second RAT, the pilot being associated with the first RAT;
    registering with the hybrid femto access point on a first channel associated with the first RAT based upon the detected pilot;
    analyzing a system selection database to determine whether the hybrid femto access point implements more than one RAT;
    analyzing the system selection database to identify a second channel associated with the second RAT of the hybrid femto access point, in response to determining that the hybrid femto access point does implement more than one RAT, wherein the second channel is listed with a higher priority or is associated with a more restrictive system description than the first channel in the system selection database; and
    selecting to handover to the identified second channel.

2. The method of claim 1, wherein detecting comprises detecting the pilot while camped on an initial channel associated with a macro base station.

3. The method of claim 1, wherein first RAT comprises 1x and the first channel comprises a 1x channel.

4. The method of claim 3, wherein the second RAT comprises High Rate Packet Data (HRPD) and the second channel comprises an HRPD channel.

5. The method of claim 4, wherein the hybrid femto access point is a co-channel HRPD femto access point.

6. The method of claim 1, wherein the system selection database comprises Preferred Roaming List (PRL) records.

7. The method of claim 6, wherein at least one of the PRL records comprises a dedicated System Identifier (SID) for the hybrid femto access point.

8. The method of claim 6, wherein at least one of the PRL records comprises an assigned Network Identifier (NID) for the hybrid femto access point.

9. The method of claim 6, wherein analyzing comprises finding in the PRL a second channel subnetID with higher listed priority than a subnetID of the first channel.

10. The method of claim 6, wherein analyzing comprises finding in the PRL a second channel associated system description more restrictive than a first channel associated system description.

11. The method of claim 1, wherein the system selection database comprises an assigned registration zone for the hybrid femto access point.

12. The method of claim 1, wherein the system selection database comprises at least one of AT-assisted information and network-broadcasted information.

13. An electronic device configured to execute the method of claim 1.

14. An apparatus operable in a wireless communication system, the apparatus comprising:
means for detecting a pilot signal from a hybrid femto access point, the hybrid femto access point implementing a plurality of radio access technologies (RATs) comprising a first RAT and a second RAT, the pilot being associated with the first RAT;
means for registering with the hybrid femto access point on a first channel associated with the first RAT based upon the detected pilot;
means for analyzing a system selection database to determine whether the hybrid femto access point implements more than one RAT;
means for analyzing the system selection database to identify a second channel associated with the second RAT of the hybrid femto access point, in response to determining that the hybrid femto access point does implement more than one RAT, wherein the second channel is listed with a higher priority or is associated with a more restrictive system description than the first channel in the system selection database; and
means for selecting to handover to the identified second channel.

15. The apparatus of claim 14, wherein the apparatus operates in one of a hybrid mode and a Simultaneous Hybrid Dual Receiver (SHDR) mode.

16. The apparatus of claim 14, wherein the means for detecting comprises a means for detecting the pilot while camped on an initial channel associated with a macro base station.

17. The apparatus of claim 14, wherein first RAT comprises 1× and the first channel comprises a 1× channel.

18. The apparatus of claim 17, wherein the second RAT comprises High Rate Packet Data (HRPD) and the second channel comprises an HRPD channel.

19. The apparatus of claim 18, wherein the hybrid femto access point comprises a co-channel HRPD femto access point.

20. The apparatus of claim 14, wherein the system selection database comprises Preferred Roaming List (PRL) records.

21. The apparatus of claim 20, wherein at least one of the PRL records comprises a dedicated System Identifier (SID) for the hybrid femto access point.

22. The apparatus of claim 20, wherein at least one of the PRL records comprises an assigned Network Identifier (NID) for the hybrid femto access point.

23. The apparatus of claim 14, wherein the system selection database comprises an assigned registration zone for the hybrid femto access point.

24. The apparatus of claim 14, wherein the system selection database comprises at least one of AT-assisted information and network-broadcasted information.

25. A computer program product comprising a non-transitory machine-readable medium further comprising instructions which, when executed by a machine, cause the machine to perform operations including:
detecting a pilot signal from a hybrid femto access point, the hybrid femto access point implementing a plurality of radio access technologies (RATs) comprising a first RAT and a second RAT, the pilot being associated with the first RAT;
registering with the hybrid femto access point on a first channel associated with the first RAT based upon the detected pilot;
analyzing a system selection database to determine whether the hybrid femto access point implements more than one RAT;
analyzing the system selection database to identify a second channel associated with the second RAT of the hybrid femto access point, in response to determining that the hybrid femto access point does implement more than one RAT, wherein the second channel is listed with a higher priority or is associated with a more restrictive system description than the first channel in the system selection database; and
selecting to handover to the identified second channel.

26. The computer program product of claim 25, wherein detecting comprises detecting the pilot while camped on an initial channel associated with a macro base station.

27. The computer program product of claim 25, wherein first RAT comprises 1× and the first channel comprises a 1× channel.

28. The computer program product of claim 27, wherein the second RAT comprises High Rate Packet Data (HRPD) and the second channel comprises an HRPD channel.

29. The computer program product of claim 28, wherein the hybrid femto access point comprises a co-channel HRPD femto access point.

30. The computer program product of claim 25, wherein the system selection database comprises Preferred Roaming List (PRL) records.

31. The computer program product of claim 30, wherein at least one of the PRL records comprises a dedicated System Identifier (SID) for the hybrid femto access point.

32. The computer program product of claim 30, wherein at least one of the PRL records comprises an assigned Network Identifier (NID) for the hybrid femto access point.

33. The computer program product of claim 25, wherein the system selection database comprises an assigned registration zone for the hybrid femto access point.

34. The computer program product of claim 25, wherein the system selection database comprises at least one of AT-assisted information and network-broadcasted information.

35. An apparatus operable in a wireless communication system, the apparatus comprising:
a processor, configured for: detecting a pilot signal from a hybrid femto access point, the hybrid femto access point implementing a plurality of radio access technologies (RATs) comprising a first RAT and a second RAT, the pilot being associated with the first RAT; registering with the hybrid femto access point on a first channel associated with the first RAT based upon the detected pilot; analyzing a system selection database to determine whether the hybrid femto access point implements more than one RAT; analyzing the system selection database to identify a second channel associated with the second RAT of the hybrid femto access point, in response to determining that the hybrid femto access point does implement more than one RAT, wherein the second channel is listed with a higher priority or is associated with a more restrictive system description than the first channel in the system selection database; and selecting to handover to the identified second channel; and a memory coupled to the processor for storing data.

36. The apparatus of claim 35, wherein the apparatus operates in one of a hybrid mode and a Simultaneous Hybrid Dual Receiver (SHDR) mode.

37. The apparatus of claim 35, wherein the processor detects the pilot while camped on an initial channel associated with a macro base station.

38. The apparatus of claim 35, wherein first RAT comprises 1× and the first channel comprises a 1× channel.

39. The apparatus of claim 38, wherein the second RAT comprises High Rate Packet Data (HRPD) and the second channel comprises an HRPD channel.

40. The apparatus of claim 39, wherein the hybrid femto access point comprises a co-channel HRPD femto access point.

41. The apparatus of claim 35, wherein the system selection database comprises Preferred Roaming List (PRL) records.

42. The apparatus of claim 41, wherein at least one of the PRL records comprises a dedicated System Identifier (SID) for the hybrid femto access point.

43. The apparatus of claim 41, wherein at least one of the PRL records comprises an assigned Network Identifier (NID) for the hybrid femto access point.

44. The apparatus of claim 35, wherein the system selection database comprises an assigned registration zone for the hybrid femto access point.

45. The apparatus of claim 35, wherein the system selection database comprises at least one of AT-assisted information and network-broadcasted information.

* * * * *